United States Patent [19]

Abe et al.

[11] Patent Number: 4,471,491

[45] Date of Patent: Sep. 11, 1984

[54] SERVICE CHANNEL SIGNAL TRANSMISSION SYSTEM

[75] Inventors: Akira Abe; Hiromi Hashimoto; Toshiyuki Takenaka; Koyo Taniguchi, all of Tokyo, Japan

[73] Assignee: Nippon Electric Company, Ltd., Japan

[21] Appl. No.: 462,796

[22] Filed: Feb. 1, 1983

[30] Foreign Application Priority Data

Feb. 4, 1982 [JP] Japan ................................ 57-16928

[51] Int. Cl.³ .......................... H04B 3/36; H04B 7/14
[52] U.S. Cl. .......................................... 455/2; 455/3; 455/22; 455/21; 375/3
[58] Field of Search ...................... 455/8, 9, 20, 21, 22; 375/3; 179/170 F, 175.31 R

[56] References Cited

U.S. PATENT DOCUMENTS 3,204,204  8/1965  Buxton et al. ........................... 455/8
3,681,694  8/1972  Sarati ..................................... 455/8
4,242,756  12/1980  Huffman et al. ....................... 455/8

FOREIGN PATENT DOCUMENTS 1908902  9/1970  Fed. Rep. of Germany .......... 455/8

Primary Examiner—Jin F. Ng
Attorney, Agent, or Firm—Ostrolenk, Faber, Gerb & Soffen

[57] ABSTRACT

A service channel signal transmission system in which a service channel signal is constantly fed to at least two radio channels in parallel. Each intermediate repeater station has a service channel demodulator which is constantly connected to either one of the radio channels. A combining and switching circuit automatically switches over the service channel demodulation to the other radio channel in response to an alarm output which indicates an abnormality in a received signal at a receiver associated with the one radio channel. The service channel is completely switched from one to the other without resorting to line switchover control signals from terminal stations.

4 Claims, 4 Drawing Figures

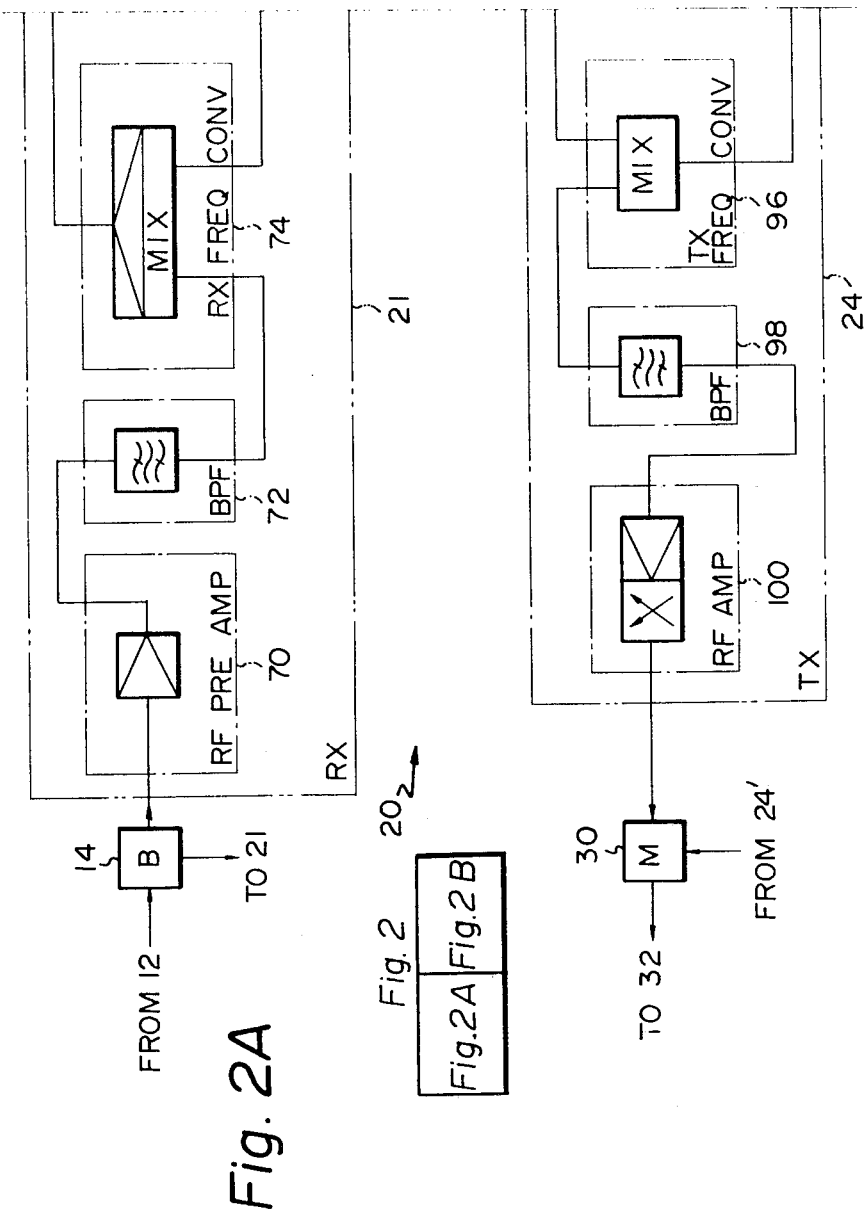

SERVICE CHANNEL SIGNAL TRANSMISSION SYSTEM

BACKGROUND OF THE INVENTION

The present invention relates to a service channel signal transmission system and, more particularly, to a service channel signal transmission system for a radio communication line of the heterodyne relaying type or direct relaying type which uses a plurality of radio channels.

A service channel signal is required for a heterodyne type of radio relaying line to monitor and control the relaying line. It has been extensively practiced to transmit a service channel signal together with desired data through a common radio communication channel, that is, without resorting to any radio channel for exclusive use. Each intermediate repeater station has a modem for interruption which is adapted to receive various commands and control signals necessary for its own station, while sending out reports and monitored data. The modem is connected to the radio channel for the transmission of the service channel signal.

Hereinafter will be described, by way of example, the service channel signal transmission system for heterodyne relaying or repeating type 4-phase PSK modulation digital radio communication lines, one for regular use and the other for spare use, which has a transmission capacity of 34.368 Mbit/s and is used at a 7 GHz radio frequency band.

A main signal is transmitted in the following manner. A 34.368 Mbit/s signal is converted at a terminal station into a 4-phase PSK signal having a modulation rate of about 17 MHz by a 4-phase PSK modulator. This 4-phase PSK signal modulates a 70 MHz intermediate frequency to provide an intermediate 70 MHz frequency whose frequency spectrum width is about 17 MHz. The intermediate frequency is modulated by a transmitter into the radio frequency of a carrier of the radio communication line and then transmitted therefrom. The radio frequency may be 7428 MHz for regular use and 7477 MHz for spare use, for example. A repeater station has a receiver which amplifies the received wave and demodulates it into the 70 MHz intermediate frequency. This 70 MHz intermediate frequency having a component demodulated by the main signal is delivered to a transmitter, modulated by the transmitter to a radio frequency different from the previously mentioned carrier frequency, and then transmitted to another repeater station or a terminal station. This time, the radio frequency may be 7589 MHz for regular use and 7638 MHz for spare use, for example.

A service channel signal, on the other hand, is inserted by further frequency-modulating the radio carrier with the component modulated by the main signal by means of the service channel signal. At a terminal, the service channel signal is separated from the main signal by a 4-phase demodulator; at a repeater, it is demodulated by a service channel signal demodulator and by partly branching the intermediate frequency which contains the component modulated by the main and service channel signals. The service channel signal transmission system described above has been widely used for service channel signal transmission on various kinds of digital radio communication lines, regardless of the applied radio frequency, transmission capacity, repeating system, or even modulation system which is not limited to the described 4-phase PSK but may be 2-phase PSK, 8-phase PSK, 16 QAM, 32 QAM, 64 QAM, FSK or ΔM, for example. Sending a service channel signal utilizing a radio line for communication has also won popularity in the art of analog radio communication.

In the prior art service channel signal transmission system discussed above, as a fault occurs in the radio channel for service signal transmission, a channel switchover control signal (generally referred to as "AL tone") exchanged between terminal stations is monitored to switch over the connection of the demodulator and the radio channel to the spare radio channel. However, this is undesirable from the economic viewpoint because each terminal station has to be furnished with a channel switchover control unit and each repeater station with an instrument for monitoring the channel switchover control signal.

Another known implement for coping with faults consists in delivering a service channel signal constantly to two radio channels in parallel and connecting the demodulator of each intermediate repeater constantly to one of the radio channels. When an alarm signal appears indicating that the received signal at a receiver in the radio channel is abnormal, the demodulator is switched over to the other radio channel. Such a system suffers from the drawback that the repeaters following the repeater which has generated the alarm signal are disenabled to receive the service channel signal. Generally, the signal-to-noise ratio exceeds a predetermined allowable value in response to a drop of the received input level (referred to as "threshold level" hereinafter). As a certain repeater receives a signal which is lower than the threshold level, it generates an alarm signal and cuts off its received signal output circuit. A transmitter associated with this radio channel includes a carrier reinsertion circuit for inserting a non-modulated carrier so that no alarm signal is caused to appear in the next repeater station and onward. Therefore, the demodulator in the next repeater station cannot be switched over.

SUMMARY OF THE INVENTION

It is an object of the present invention to provide a service channel signal transmission system which overcomes the drawbacks inherent in the prior art systems and permits the service channel to be fully switched over without the need for the supply of channel switchover control signals from terminal stations.

It is another object of the present invention to provide a generally improved service channel signal transmission system.

An intermediate repeater station in a service channel signal transmission system embodying the present invention transmits a service channel signal containing various data necessary for using and monitoring a radio communication line, in parallel by a relaying line which is made up of at least two radio channels. Repeaters are associated with the radio channels in one to one correspondence. Each repeater comprises a receiver including an alarm circuit for generating an alarm signal indicative of an abnormality in a received signal, and a received signal branching circuit for outputting part of the received signal by branching this part from the rest. The repeater also comprises a transmitter including a carrier reinsertion circuit responsive to an abnormality in the received signal for intercepting an output of the receiver which is the received signal and inserting a non-modulated carrier wave thereinto, a service channel modulator means responsive to the service channel signal for producing a modulated service channel signal and means for carrying the modulated service channel signal with the non-modulated carrier wave. Selector means switchingly selects one of the two outputs of the received signal branching circuits of each of the receivers. At least one service channel demodulator means is provided for demodulating the branched output selected by the selector means and delivering a demodulated output. Part of the demodulated output is branched by branching means and delivered as the service channel signal. This service channel output signal from the branching means is distributed by distributor means to each of the radio channels. Combining and switching means divides the service channel output signal of the branching means, combines each of the divided signal part with each of the service channel signals distributed from the distributor means, and supplies the service channel modulator means of the transmitter with each of the composite outputs. The carrier reinsertion circuit, selector means and combining and switching means are controlled by control means such that the service channel signal from the repeater associated the radio channel which is not generating the alarm signal is demodulated and fed to the service channel modulator of the transmitter of the repeater associated with the radio channel which is producing the alarm signal.

In accordance with the present invention, a service channel signal transmission system in which a service channel signal is constantly fed to at least two radio channels in parallel. Each intermediate repeater station has a service channel demodulator which is constantly connected to either one of the radio channels. A combining and switching circuit automatically switches over the service channel demodulator to the other radio channel in response to an alarm output which indicates an abnormality in a received signal at a receiver associated with the one radio channel. The service channel is completely switched from one to the other without resorting to line switchover control signals from terminal stations.

Other objects and features, together with the foregoing, are attained in the embodiment described in the following description and illustrated in the accompanying drawings.

BRIEF DESCRIPTION OF THE DRAWINGS

FIG. 2 shows the connection for FIGS. 2A and 2B;

FIGS. 2A and 2B are block diagrams showing an example of repeater stations included in the system shown in FIG. 1.

DESCRIPTION OF THE PREFERRED EMBODIMENT

While the service channel signal transmission system of the present invention is susceptible of numerous physical embodiments, depending upon the environment and requirements of use, a substantial number of the herein shown and described embodiment have been made, tested and used, and all have performed in an eminently satisfactory manner.

Figure 1:
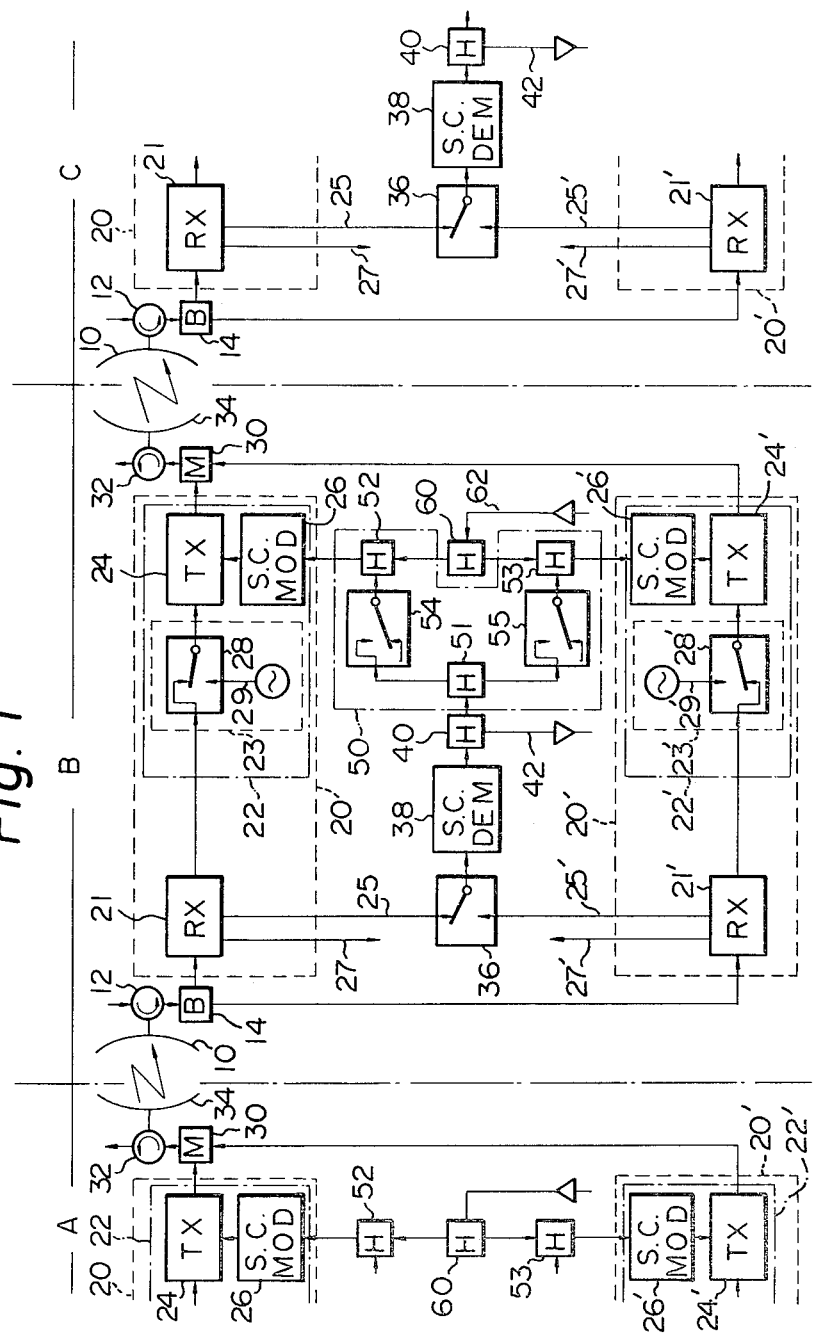
FIG. 1 is a block diagram of a service channel signal transmission system embodying the present invention.

Referring to FIG. 1 of the drawings, there is shown an arrangement associated with a service channel at an intermediate repeater station included in a heterodyne relaying type of radio communication line, which has one regular radio channel and one spare radio channel. The arrangement is illustrated and will be described with respect to one transmission direction.

An intermediate repeater B has an antenna 10 for receiving a radio wave emitted from a repeater A just ahead thereof with respect to the one transmission direction. The radio wave coming in through the antenna 10 is passed through a circulator 12 to a branching circuit 14 to be thereby divided into regular and spare radio channels. The regular channel output of the branching circuit 14 is converted into an intermediate frequency and amplified by a receiver section 21 included in a repeater 20 for regular use. Likewise, the other or spare channel output of the branching circuit 14 is converted into an intermediate frequency and amplified by a receiver section 21' of a repeater 20' for spare use. The outputs of the receivers 21 and 21' are coupled to transmitter sections 22 and 22', respectively. The transmitter section 22 has therein a carrier reinsertion circuit 23 which includes a switch 28, while the transmitter section 22' has therein a carrier reinsertion circuit 23' which includes a switch 28'. The outputs of the carrier reinsertion circuits 23 and 23' are respectively fed to main transmitter 24 and 24' to be frequency-converted and amplified again. The outputs of the main transmitters 24 and 24' are transmitted to the next repeater C via a combining circuit 30, a circulator 32 and an antenna 34 successively.

The receivers 21 and 21' individually have branch signal output lines (FIGS. 2A and 2B) adapted to branch part of the outputs of their associated receivers. A selector or switch 36 selects either one of the outputs 25 and 25' on the branch signal output lines and feeds it to a service channel demodulator 38 and therethrough to a hybrid or splitter 40 to be partly used as a service channel signal output 42 of the repeater B. The rest of the output of the hybrid 40 is coupled to a combining/switching circuit 50 which comprises hybrids or splitters 51, 52 and 53 and switches 54 and 55. The circuit 50 combines the hybrid output with a service channel input signal 62 from the repeater B which is bisected by a hybrid distributor circuit 60 and delivered to the service channel modulators 26 and 26' of the transmitters 22 and 22', respectively. Further, the receivers 21 and 21' include alarm circuits (FIG. 2B) each of which generates an alarm signal 27 or 27' in response to any abnormality in input signal. The alarm signal 27 or 27' actuates the switches 36, 54 and 55 and the switch 28 or 28' of the carrier reinsertion circuit 23 or 23'. Thus, when one of the radio channels from the repeater A such as the regular radio channel has been shut off, the service channel signal is demodulated from the spare radio channel to supply as a modulating to the service channel modulator on the regular side. The radio wave transmitted from the repeater B to the repeater C will therefore have been demodulated by the service channel signal in both the radio channels. The positions of the switches 36, 54, 55, 28 and 28' shown in FIG. 1 represent a situation in which both the radio channels are normal.

In operation, when the regular radio channel on the repeater 20 side has encountered a fault, the carrier reinsertion circuit 23 has its switch 28 actuated by the resulting alarm signal 27 so that the noise from the receiver 21 is cut off and a non-modulated carrier signal 29 is fed to the transmitter 24. At the same time, the selector 36 becomes positioned to pass the output 25' of the receiver 21' of the spare repeater 20' therethrough and the switch 54 of the combining/switching circuit 50 is closed. Hence, the service channel signal demodulated by the demodulator 38 is delivered to the modulator 26 so as to produce a modulated service channel signal from the transmitter 24. Because the repeater 20' relays the modulated service channel signal as has been the case with the prior art system, both the radio channels will transmit the service channel signal throughout the communication line after the repeater station B.

When a fault has occurred in the spare side on the other hand, the switches 28' and 55 are operated while the selector 36 is positioned to select the output 25 of the receiver 21 as in the normal situation. The transmitter 24', therefore, produces a modulated service channel signal which corresponds to the demodulated version of the regular side output 25.

In the prior art parallel service channel signal transmission system which lacks the combining/switching circuit 50, a service channel signal transmitted from the repeater station A is intercepted by the switch 28 or 28' and thereby prevented from advancing to the repeater station C and onward. Meanwhile, because the transmit wave from the repeater station B is not cut off due to the reinsertion of the non-modulated carrier, the repeater station C does not generate any alarm signal 27 or 27' with the selector 36 kept non-actuated. It follows that when the regular reception side at the repeater station B has been shut off, the service channel signal becomes interrupted by the switch 28 of the repeater B so that the data transfer from the repeater stations ahead of the station B to those past of the station B tends to be blocked up. It will be noted that manual operation of the selector 36 is available for the transfer of the information which has been naturally supplied to the spare side.

The operations of the transmitter and receiver will be described hereunder together with the manner of alarm generation.

Figure 2B:
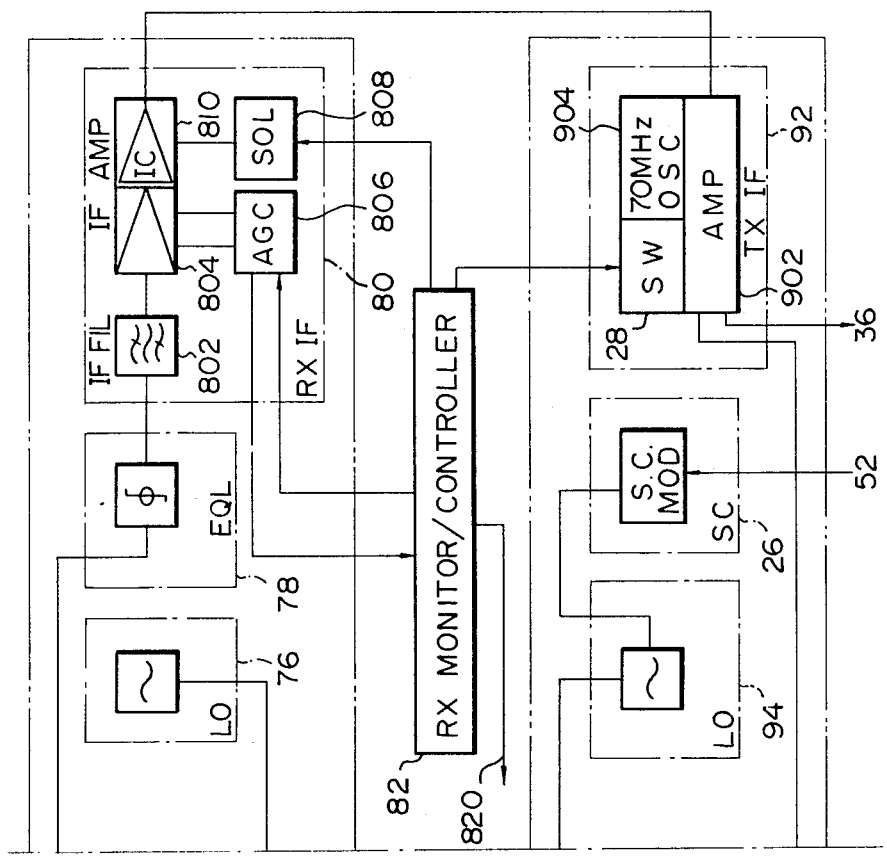

Referring to FIGS. 2A and 2B, there are shown in detailed block diagram the repeater 20 associated with the regular radio channel; the other or spare repeater 20' shares the same construction. The receiver 21 of the repeater 20 includes a radio frequency preamplifier 70 adapted to amplify the wave in the regular radio channel fed from the branching circuit 14 shown in FIG. 1. The amplified output is passed through a band-pass filter 72 to a receive frequency converter 74 which includes a mixer section. The input signal of 7428 MHz to the frequency converter 74 is combined by the mixer with an output of a local oscillator 76, thereby being converted into a 70 MHz intermediate frequency which includes a component demodulated by the main and service channel signals. This intermediate frequency is fed to a phase equalizer 78 to equalize a phase delay and then delivered to a receive intermediate frequency section 80. In the intermediate frequency section 80, the input is fed through an intermediate frequency filter 802 to an intermediate frequency amplifier 804. Here, an automatic gain control 806 is installed in the intermediate frequency section 80 to control the gain fluctuation of the intermediate frequency so that the output may be free from fluctuation due to fluctuation of the receive electric field or like cause. Simultaneously, the output of the automatic gain control 806 is detected by a receive signal monitor/controller including an alarm signal generator 82. When the received wave in the radio frequency band is lower than the threshold level, the monitor/controller 82 detects it due to the fall of the AGC output and then generates an alarm indicative of the abnormal signal reception. At the same time, the monitor/controller 82 applies a bias opposite to the one under the normal condition to an IC 810 of the intermediate frequency amplifier 804 by way of a squelch circuit 808.

The transmitter 24 includes a transmit intermediate frequency section 92 which includes an amplifier 902. Under the fault-free situation, the intermediate frequency from the receiver 21 is amplified by the amplifier 902 and then routed along two different paths: one leading to a transmit frequency converter 96 and the other to the selector 36 which precedes the service channel demodulator 38. In the event the receive electric field has lowered beyond the threshold level or the output of the receiver 21 has been intercepted, the monitor 82 delivers a signal 820 to actuate the switch 28 such that the non-modulated output signal of a 70 MHz local oscillator 904 is selected. At the same time, the alarm output 820 from the monitor/controller 82 actuates the switches 36, 54 and 55. The intermediate frequency signal from the oscillator 904 is fed through the switch 28 and the amplifier 902 to the transmit frequency converter 96 is mixed with the output of a local oscillator which differs from the transmission frequency of the transmitter 24 by 70 MHz, thereby being converted into a transmission frequency of 7428 MHz. In this instance, because the local oscillator 94 has been modulated by the service channel signal through the service channel modulator 26, the output of the transmit frequency converter 96 includes a component modulated by the service channel. The output of the frequency converter 96 is passed through a band-pass filter 98, amplified by a radio frequency amplifier 100 up to the transmission output level, combined with the output of the spare repeater 20' by the combining circuit 30, and then transmitted to the next repeater station or a terminal station via the circulator 32 and antenna 34.

In summary, it will be seen that the present invention provides an economical yet positively operable service channel signal transmission system which does not rely on the supply of channel switchover control signals from terminal stations but employs parallel transmission of a service channel signal. Even if an intermediate repeater station responds to a reception signal alarm output of its own repeater by automatically switching over a service channel demodulator thereof, branched reception is fully insured at every intermediate repeater station.

Various modifications will become possible for those skilled in the art after receiving the teachings of the present disclosure without departing from the scope thereof. For example, three or more radio channels may be employed to allocate two of them to the service channel signal. The service channel demodulator 38 shown and described as being connected to the output of the selector 36 may be replaced by two such demodulators with a selector connected to the outputs thereof. While the output of the service channel demodulator 38 is equally divided into two parts by the hybrid 40 in the embodiment shown and described, the hybrid and, therefore, strict halving are not essential in accordance with the invention. This also holds true for the hybrids 51, 52 and t3 of the combining/switching circuit 50 and the distributor circuit or hybrid 60.

If desired, a service channel signal may be fed in parallel to three or more radio channels, instead of two. Then, each of the selector, combining/switching circuit and distributor circuit or hybrid will be of a number matching with the number of the parallel channels, while the switchover logic circuit will be constructed accordingly.

Further, the present invention is applicable not only to the heterodyne relaying system but to a direct relaying system which transmits a service channel signal after varying the frequency without converting it to an intermediate frequency, a detection type relaying system which relays a service channel signal by varying the frequency to the base band. Additionally, the present invention is applicable to analog communication, not to speak of the digital communication shown and described.

What is claimed is:

1. An intermediate repeater station in a service channel signal transmission system wherein a service channel signal containing various data necessary for using and monitoring a radio communication line is transmitted in parallel by a relaying line which is made up of at least two radio channels, comprising, in combination:
    (a) repeaters associated with the radio channels in one to one correspondence, each of said repeaters comprising,
        (i) a receiver including an alarm circuit for generating an alarm signal indicative of an abnormality in a received signal, and a received signal branching circuit for outputting part of the received signal by branching said part from the rest, and
        (ii) a transmitter including a carrier reinsertion circuit responsive to an abnormality in the received signal for intercepting an output of said receiver which is the received signal and inserting a non-modulated carrier wave, a service channel modulator means responsive to the service channel signal for producing a modulated service channel signal and means for receiving the modulated service channel signal with the non-modulated carrier wave;
    (b) selector means for switchingly selecting one of the outputs of the received signal branching circuits of each of said receivers;
    (c) at least one service channel demodulator means for demodulating the branched output selected by the selector means and delivering a demodulated output;
    (d) branching means for branching part of the demodulated output and delivering said branched part as the service channel signal;
    (e) distributor means for distributing the service channel output signal from said branching means to each of the radio channels;
    (f) combining and switching means for dividing the service channel output signal of the branching means, combining each of the divided signal part with each of the service channel signals distributed from the distributor means, and supplying the service channel modulator means of the transmitter with each of the composite outputs; and
    (g) control means for controlling the carrier reinsertion circuit, the selector means and the combining and switching means such that the service channel signal from the repeater associated with the radio channel which is not generating the alarm signal is demodulated and fed to the service channel modulator of the transmitter of the repeater associated with the radio channel which is producing the alarm signal.

2. An intermediate repeater station as claimed in claim 1, in which the repeating system is the heterodyne repeating system.

3. An intermediate repeater station as claimed in claim 1, in which the repeating system is the direct repeating system.

4. An intermediate repeater station as claimed in claim 1, in which the repeating system is the detection type repeating system.

* * * * *